Sept. 4, 1934.  C. D. FAGAN ET AL  1,972,261
DISPENSING SYSTEM
Filed May 12, 1931   2 Sheets-Sheet 1

INVENTORS
Charles D. Fagan
Rehl W. Swank
BY Ramsey & Kent
their ATTORNEYS.

Sept. 4, 1934.  C. D. FAGAN ET AL  1,972,261
DISPENSING SYSTEM
Filed May 12, 1931   2 Sheets-Sheet 2

INVENTORS
Charles D. Fagan
Rehl W. Swank
BY Ramsey & Kent
their ATTORNEYS.

Patented Sept. 4, 1934

1,972,261

UNITED STATES PATENT OFFICE 1,972,261

DISPENSING SYSTEM

Charles D. Fagan, Sharon, and Rehl W. Swank, Sharpsville, Pa.

Application May 12, 1931, Serial No. 536,716

1 Claim. (Cl. 221—95)

The present invention relates broadly to dispensing apparatus and more especially to an apparatus adapted for dispensing of gasoline.

One common system in use for dispensing gasoline comprises a storage tank buried in the ground and a pump system adapted to withdraw gasoline from the storage tank and dispense it through suitable measuring devices and a flexible hose to automobiles or the like.

In this type of system, it is usual to provide the flexible hose with a nozzle valve and it is also required by law in many States that a visible indicator be provided to show when gasoline is flowing through the dispensing hose.

In connection with these systems, it is customary to provide the pipe leading to the storage tank with a check foot-valve which prevents return of gasoline from the pipe and thereby keeps the system filled with liquid gasoline.

Since the storage tank is buried in the ground, it frequently happens that the gasoline in the storage tank is at a considerably lower temperature than the temperature of the dispensing hose and piping in the dispensing cabinet, which often is exposed to the sun's rays. When the entire piping system is filled with cool gasoline from the storage tank and the dispensing nozzle is closed, the pipes above ground including the dispensing nozzle, heat the gasoline in the system and in view of the fact there is a closed valve at the lower end of the pipe line and a closed dispensing valve at the outer end of the pipe line, the entire system is under considerable pressure which increases as the temperature of the gasoline in the pipes rises. This has resulted in bursting of pipes and frequent breakage of the visible flow indicators which are usually made of glass. Because of these accidents, the authorities have required the glass indicators to be of sufficient strength to withstand as much as three hundred pounds per square inch. This high pressure renders the dispensing hose stiff and rigid so it is difficult to handle and when the dispensing valve is opened, pressure of gasoline therefrom is often so excessive as to spill and splash the gasoline.

Air chambers in the line have been proposed to prevent bursting of parts but air chambers merely form storage members for excessive pressure, which is not desirable and furthermore, in use, air chambers lose their air content and eventually become storage chambers for additional cool gasoline which when heated accentuates rather than placates the difficulties.

The present invention overcomes the difficulties of the known art by providing a suitable relief valve in the piping system within the storage tank, so that as pressure increases in the pipe line system, this pressure is relieved in such manner that the excess gasoline flows back into the storage tank. This relief mechanism is adapted to be adjusted in such manner as to not be operated until a predetermined pressure is reached in the piping system, which predetermined pressure is sufficiently low so as not to cause the bursting of the parts and at the same time, the relief valve closes before the pressure has been reduced to such an extent as to leave the piping system without some pressure therein. The system is therefore at all times protected against excess of pressure and at the same time gasoline is retained in the system as is desired.

It is recognized that the invention may be practiced by mechanisms and devices other than those specifically disclosed herewith, and, therefore, the present disclosure is to be understood as being illustrative and not in the limiting sense.

Figure 1:
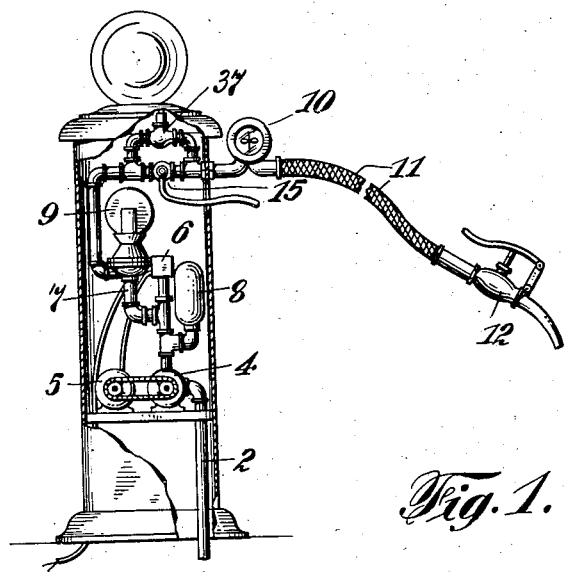
Fig. 1 is an elevational view with certain parts shown in section.

Referring now to the drawings and more especially to Fig. 1, the storage tank 1 is adapted to be buried in the ground and is provided with the usual filling and vent pipes common in the art. A lift pipe 2 extends near the bottom of the storage tank and leads to a lift pump 4 which may be operated by an electric motor 5. This electric motor may be manually controlled or it may be operated by a pressure control box 6 so that when the pressure in the line drops to a predetermined amount, the control box closes the switch to operate the motor and to build up pressure in the pipe line. The outlet from the pump comprises a system of piping 7 in which is provided an air chamber 8 and this system of piping 7 leads through a suitable meter 9 to a visual indicator 10 which may be of the type illustrated in Fagan Patent No. 1,673,000, June 12, 1928. A dispensing hose 11 is connected with the outlet of the visual indicator and is provided with a manually operable dispensing valve 12.

In order that the lift pipe and the system above this pipe shall be kept filled with liquid, the lower end of the lift pipe is provided with a foot-valve 14 which is a check valve operating to prevent back flow of gasoline into the tank. From the foregoing, it will be observed that when the nozzle valve 12 is closed, the pipe system from the foot-valve to the nozzle valve has no relief in the case of pressure.

In certain States, a cut-off valve 15 is required between the meter system and the nozzle valve. This cut-off valve further tends to accentuate the difficulty in that it isolates the gasoline in the hose and also closes the upper end of the pipe system so that when pressure builds up in either of the two isolated sections, there is no means for relief.

Figures 3, 4:
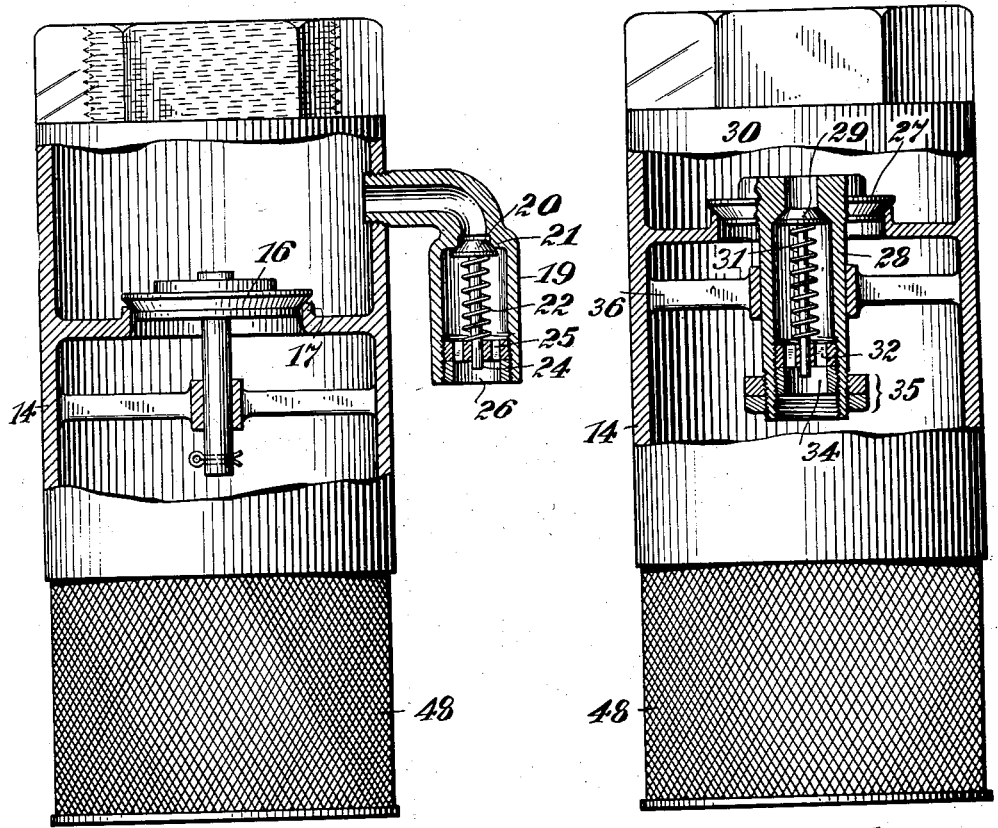
Fig. 3 is a detail view of one form of the relief valve with parts of the side walls in section.
Fig. 4 shows a modification of the relief valve with certain parts shown in section.
Figure 5:
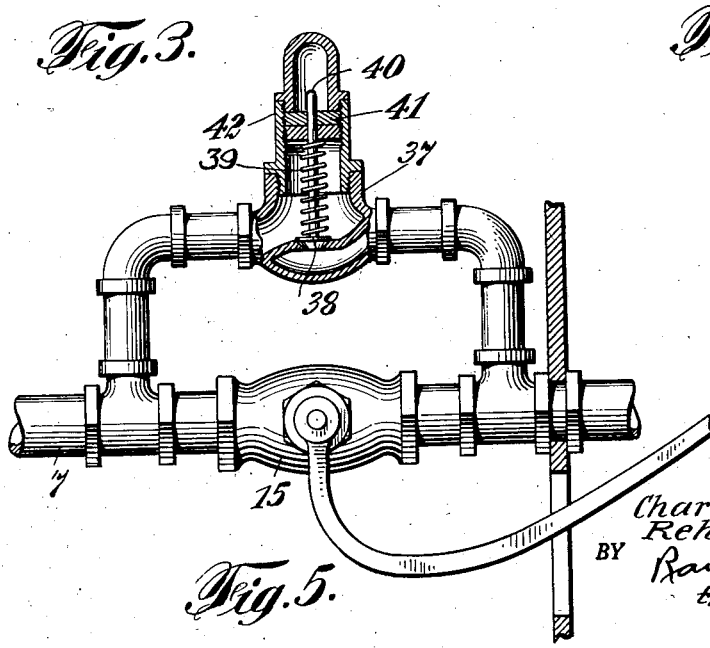
Fig. 5 shows a relief valve around the cut-off valve to the dispensing hose with parts of the relief valve in section.

The present invention resides more especially in providing suitable relief valves whereby the built up pressure in the pipe system may be lifted by drainage of a liquid back to the storage tank. One form of the relief valve may be attached to the side of the foot-valve as illustrated in Fig. 3. The foot-valve 14 may comprise a pressure and gravity operated check 16 which operates on a seat 17 in a partition wall 18 of the foot-valve 14. A relief valve 19 may be connected with the foot-valve 12 above the partition 18. The relief valve 19 comprises a valve member 20 which is seated against a suitable seat 21 by means of a spring 22 surrounding the stem 24 of the valve member 20. This spring 22 is adapted to be adjusted by a spider 25 which is screw threaded into the casing of the relief valve 19 and the spider is locked in adjusted position by a lock ring 26. It therefore will be seen that when pressure builds up in the pipe system above the foot-valve 14, this pressure is relieved through the relief valve 19 when the pressure has reached a sufficient amount to overcome the resistance of the spring 22.

The relief valve may be incorporated directly in the foot-valve as is illustrated in Fig. 4, in which form the check 27 of the foot-valve is provided with a hollow stem 28 which carries a relief valve member 29 that is seated against a seat 30 by a spring 31 which is adjusted by a spider 32 screw threaded in the stem 28 of the check 27 and which spider 32 may be locked in place by a lock ring 34. A pair of lock nuts 35 may be provided on the stem 28 to prevent displacement of the check 27 and the stem 28 may be guided in a spider 36.

Where the cut-off valves 15 are required, it is desirable to provide a bypass relief valve 37 around the cut-off valve 15. This bypass relief valve is connected with a piping on each side of the cut-off valve 15 so that when pressure builds up in the dispensing hose, this pressure raises the valve member 38 against spring 39 carried by the stem 40 and which spring is adjustable by a pair of lock nuts 41 in the cap housing 42 of the relief valve.

Figure 2:
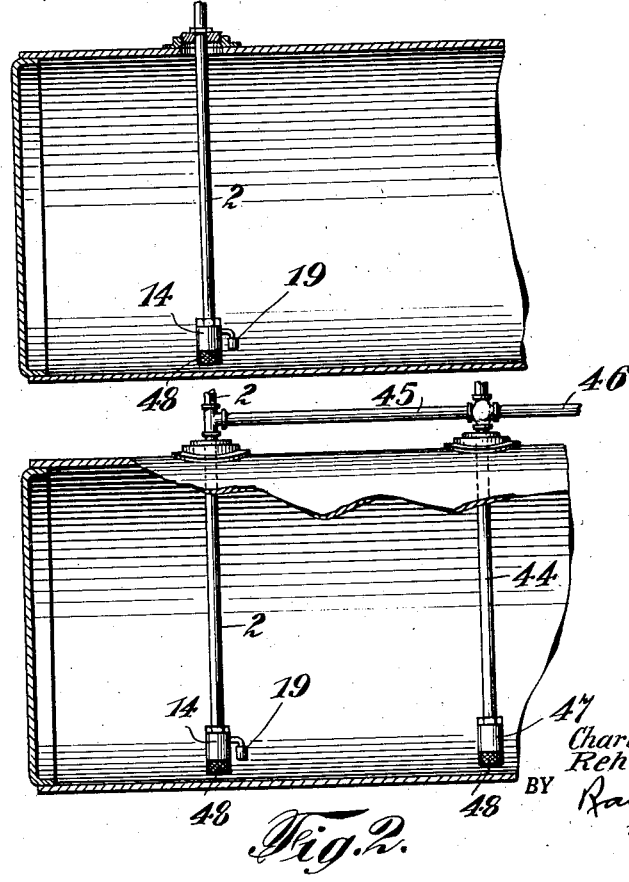
Fig. 2 is a detail view of one feature with certain parts shown in section.

Fig. 2 illustrates a storage tank construction with which a plurality of dispensing apparatus is connected and in this form, a second lift pipe 44 is illustrated. The lift pipe 44 is connected by a cross pipe 45 with the lift pipe 2 and this cross pipe may be extended as at 46 to other lift pipes connected with the same storage tank. In this construction, it is necessary to provide but one relief valve 19 on one foot-valve since the one relief valve in the tank relieves the entire pipe system. The foot-valve 47 on the lift pipe 44 is merely a plain check valve. Preferably, all of the foot-valves are provided with wire screening 48 to screen dirt from the liquid which may accidentally enter the tank.

From the foregoing, it will be observed that the entire system is adequately protected against excessive pressure which may rise due to temperature differential between the liquid in the storage tank and the liquid pipe system above ground.

Having described our invention, we claim:

In a liquid dispensing system, the combination of a storage tank, a dispensing passage extending from the storage tank and including in part a flexible conduit, a manually operated valve at the delivery end of said conduit, an inwardly opening check valve at the inlet end of said passage, a pump located in said passage, said check valve operating to retain said pump primed with liquid, a cut-off valve for isolating the flexible conduit portion of the passage from the remaining portion thereof, a pressure responsive valve adjacent said check valve to return liquid from the lower end of said passage to the tank, a by-pass around said cut-off valve to connect the flexible conduit portion with the remaining portion of the passage, and a pressure responsive valve normally closing said by-pass and adapted to be opened when the pressure in the flexible conduit exceeds the pressure in the remaining portion of the passageway.

CHARLES D. FAGAN.
REHL W. SWANK.